Sept. 12, 1950     E. M. WILSON     2,522,152
ASPARAGUS STEAMER
Filed Feb. 28, 1947

INVENTOR.
EMILIE MASON WILSON
BY
Boyken, Mohler & Beckley
ATTORNEYS

Patented Sept. 12, 1950

2,522,152

UNITED STATES PATENT OFFICE 2,522,152

ASPARAGUS STEAMER

Emilie Mason Wilson, San Francisco, Calif.

Application February 28, 1947, Serial No. 731,632

7 Claims. (Cl. 99—450)

1

This invention relates to an asparagus steamer and has for one of its objects the provision of a container for holding asparagus on end and vertically within an outer vessel for steaming said asparagus, and which container is adapted to be manipulated for draining the asparagus after it has been cooked, and for easily and neatly releasing the asparagus onto a plate.

Another object of the invention is the provision of an asparagus steamer in the form of a cylindrical receptacle made up of separate and separable wedge shaped containers each adapted to support an individual portion of asparagus upright therein and each of which containers is provided with a releasable bottom for releasing the asparagus therefrom for depositing the asparagus on a plate.

A still further object of the invention is the provision of a steamer that is adapted to be easily handled by a relatively inexperienced person for steaming vegetables and the like without the necessity for such person handling the vegetables when hot to effect the draining and removal from the steamer.

Heretofore, it has been customary to tie asparagus into a bunch or into individual bunches, and to either steam or boil the same in a receptacle. After the asparagus is cooked, the operator must fish the bunch or bunches from the receptacle and remove the cord or band holding each bunch together. The procedure many times results in scalded fingers and broken asparagus and in a disordered array of asparagus on the plate. The procedure invariably is troublesome, in that the asparagus must be tied and untied.

By the present invention, the asparagus is supported upright in one or more groups of any desired size without tying or otherwise securing the stalks together and the groups may be readily lifted into and out of the steamer or cooker, free from touching the stalks and the danger of damaging the tips. Upon removal, they may be quickly and neatly deposited on the plate or plates in an ordered array, all without manually touching the stalks from the time they are first arranged in the desired group or groups.

Other objects and advantages will appear in the description and in the drawings.

In the drawings, Fig. 1 is a plan view of a cylindrical receptacle that comprises the separate nested, wedged shaped containers for asparagus.

Figure 3:
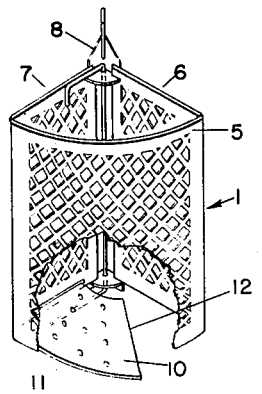
Fig. 3 is a perspective view of one of the containers taken from a slightly different angle than that of Fig. 2 and with the near wall broken away to show the bottom wall, the latter being in released position for releasing the asparagus (not shown).

2 ing the bottom of the container of Fig. 3 and its structure.

In detail the steamer illustrated does not show the outer water carrying receptacle, which may be any closed vessel of suitable shape, there being many ordinary cooking vessels having removable covers suitable for this purpose.

Figure 1:
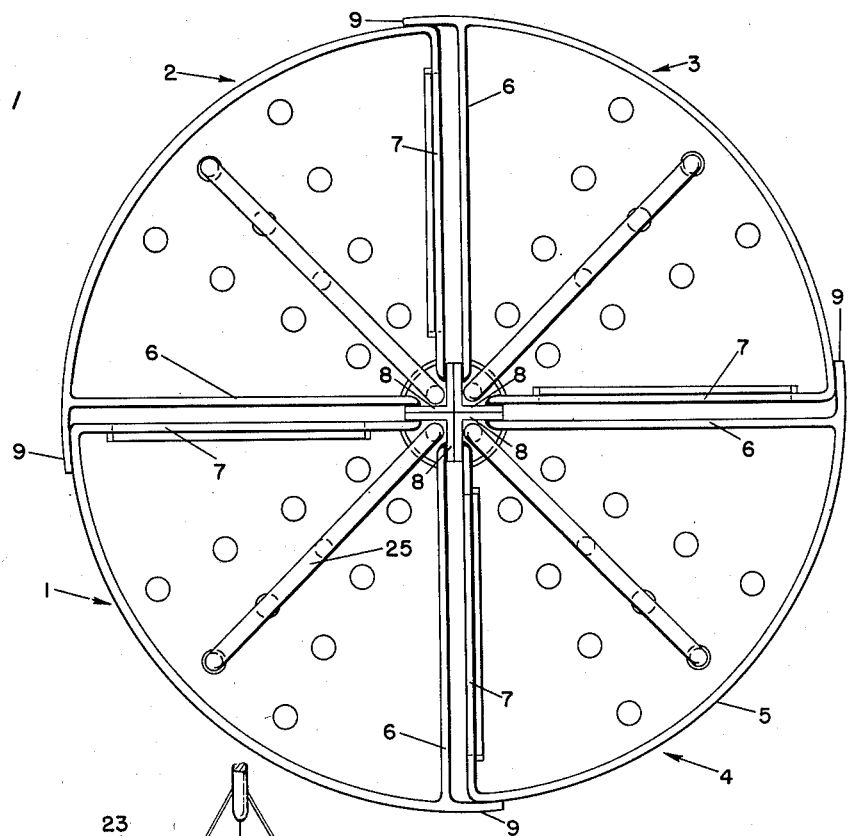

The asparagus containing portion illustrated comprises a cylindrical, vertically disposed receptacle that is divided into a plurality of separable wedge-shaped containers, generally designated 1, 2, 3, 4, one of the walls of each being a segment 5 of the cylindrical wall of the receptacle. Two flat vertical walls 6, 7 extend convergently from the lateral edges of wall 5 to connect with the flanges of a vertical angle strip 8 marginal portion 9 of each wall 5 (Fig. 1) extends laterally past the edge of the wall 5 of the adjacent container and over the marginal portion thereof as best seen in Fig. 1, whereby the containers 1, 2, 3, 4 will be partially nested together and in a unitary body or assemblage with the angle strips positioned with their corners or apices along the central axis of the assemblage as seen in Fig. 1.

The sides 5, 6, 7 are preferably of perforated sheet metal forming a smooth inner surface that will not tend to catch on asparagus or vegetables positioned therein when the latter are slid therefrom.

The bottom wall 10 of each container is perforated and is substantially triangular or wedge shaped, and fits within the walls 5 to 7 with a curved edge 11 (Fig. 3) adapted to fit along wall 5 and straight edges 12, 13 adapted to fit along walls 6, 7 respectively.

Walls 5, 6, 7 each may have imperforate marginal portions, both for the purpose of reinforcement and to facilitate securing the sides 6, 7 to angle strip 8 and securing sides 6, 7 to side 5, although sides 5, 7 may be integrally formed and bent at their juncture.

Figure 4:
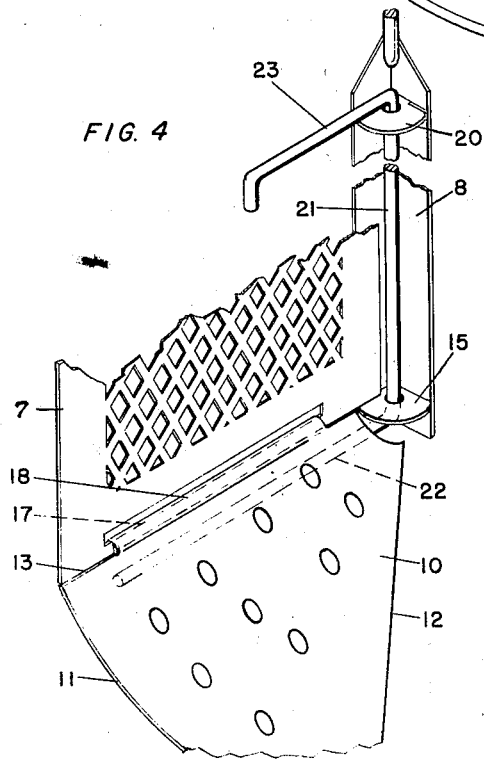
Fig. 4 is an enlarged, fragmentary view show-

A small segment 15 is secured to the lower end of each strip 8 to fit the reentrant angle between the sides of the angle strip and is secured to the latter at the level of bottom wall 10 (Fig. 4).

Figure 2:
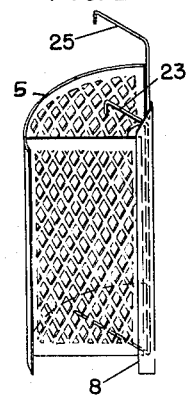
Fig. 2 is a perspective view of one of the containers of Fig. 1.

The wall 5 of each container and strip 8 terminate at their lower ends below the lower edges of walls 6, 7 (Fig. 2), and each container is supported vertically on said lower ends of wall 5 and strip 8.

The bottom wall 10 is pivotally secured to the lower end of wall 7 of each container, so as to swing from a horizontal position with its edge 12 adjacent the lower edge of wall 6, and coplanar with segment 15, to a vertically downwardly extending position about coplanar with wall 7. The pivot may be formed by horizontally slotting the lower imperforate marginal portion of each wall 7 so that a narrow strip 17 forming the lower side of each slot may be pivotally engaged by an extension 18 of bottom wall 10 that extends through said slot and is bent around strip 17 (Fig. 4).

A second segment 20, similar to segment 15, is secured to the upper end of each strip 8, and segments 15, 20 are formed with coaxial openings through which extends a rod 21, the latter being rotatable about its vertical axis in said openings.

Below the segment 15, rod 21 has a lateral extension 22 that extends below the bottom 10 and which extension is adapted to swing from a position adjacent wall 6 supporting bottom wall 10 horizontal, to a position below wall 7, permitting the bottom wall 10 to fall to its vertical position depending from wall 7 upon rotating rod 21 in one direction.

A lateral extension 23 above segment 20 (Fig. 4) provides a handle to enable said rotation of the rod 21 and the movement of extension 22 as above described. When the bottom 10 is open, or is depending from wall 7, a reverse rotation of rod 21 back to the asparagus supporting position of extension 22 will result in swinging the bottom wall 10 back to said last mentioned position.

While each container could be lifted from the others, and from the outer vessel (not shown) by use of extension 23, there might be a premature accidental release of the bottom wall in doing so. Therefore, I preferably rigidly secure a laterally extending handle 25 to the upper end of each strip 8 above the extension 23. This handle 25 extends centrally over each container and in this position, the container, when filled, will remain substantially vertical when lifted.

In actual practice, assuming preparations are made to cook asparagus for four persons, the asparagus is properly cut at their butt ends and a proper portion for each person is positioned vertically in each container, the asparagus stalks standing on their butt ends. The tips will be below extension 23.

The containers are then placed in any outer vessel large enough to hold the containers, and to enable a cover to be positioned over the latter including handles 25. The desired amount of water is placed in the outer vessel, which usually may come about up to the bottom 10 or even less, inasmuch as the asparagus cooks fairly fast and is merely steamed, although there would be no particular objection if the water level were higher, provided the asparagus were not floated in the water.

After the asparagus has been subjected to steaming for the desired length of time, each container is lifted from the outer vessel by handle 25 and any surplus water is drained therefrom, after which the container is positioned over the desired plate and the extension 23 is swung to release bottom 10 for swinging to open position. The asparagus slides freely out of the lower end of the container and is uninjured and neatly deposited on the plate. The fact that the inner surfaces of walls 5 to 7 and 10 are smooth, even though said walls are perforated, precludes any tendency of the asparagus to catch on the walls and to sustain injury.

The bottom 10 of each container may be closed after the asparagus is released, and later washed, the latter being readily accomplished by opening the bottom and running water or any desired cleaning utensil through the container.

It is to be understood that the containers may be any desired number, and not necessarily four, although it is preferable that they act to form a cylindrical assembly, or substantially so.

It is to be understood that the detailed description and drawings are not to be taken as restrictive of the invention, but merely illustrative of a preferred form.

In many instances the lower extension 22 of rod 21 merely extends below bottom 10 midway between its straight edges for supporting the bottom, as shown in the drawings.

I claim:

1. In an asparagus steamer, a container having perforated side walls and a perforated bottom wall, means supporting said bottom wall on one of said side walls for swinging downwardly from a horizontal asparagus supporting position to a generally vertically extending position depending from said one of said side walls, movable means extending from said bottom wall to a point above said side walls engaging said bottom wall for releasably holding said bottom wall in said asparagus supporting position, said side walls including an adjacent pair thereof connecting along their adjacent edges at an acute angle, said one of said side walls being one of said adjacent pair, and said means including a vertical rod within said container adjacent said adjacent edges of said pair of side walls supported for rotation about its axis, a projection on the lower end of said rod extending under the said bottom and swingable upon rotation of said rod to a position freeing said bottom for said downward swinging of the latter, and for swinging said bottom back to said asparagus supporting position after said bottom has been freed for swinging downwardly.

2. A steamer for asparagus comprising a cylindrical receptacle divided into separable individual wedge-shaped containers having their apices disposed adjacent and around the central vertical axis of said receptacle, and each having two adjacent perforated side walls extending divergently and radially from said axis to the cylindrical wall of the said receptacle, said cylindrical wall being divided into separate perforated segments respectively extending between each of said two adjacent side walls and forming the third side of each container, a perforated bottom wall at the lower end of each container swingably supported on one of the said two adjacent side walls of each container for swinging downwardly from a horizontal asparagus supporting position to a vertical position depending from said one of the two adjacent side walls, rotary means adjacent said axis and in each of said containers for releasably supporting the bottom wall of each container in said horizontal position and movable upon said means to a position in which each of said bottom walls is adapted to swing to said vertical position, means for separately lifting each of said containers from the others, and means on said containers for releasably supporting them together to form said cylindrical receptacle.

3. A steamer for asparagus comprising a cylindrical receptacle divided into separable individual wedge-shaped containers having their apices disposed adjacent and around the central vertical axis of said receptacle, and each having two adjacent perforated side walls extending divergently and radially from said axis to the cylindrical wall of the said receptacle, said cylindrical wall being divided into separate perforated segments respectively extending between each of said two adjacent side walls and forming the third side of each container, a perforated bottom wall at the lower end of each container swingably supported on one of the said two adjacent side walls of each container for swinging downwardly from a horizontal asparagus supporting position to a vertical position depending from said one of the two adjacent side walls, rotary means adjacent said axis and in each of said containers for releasably supporting the bottom wall of each container in said horizontal position and movable upon said means to a position in which each of said bottom walls is adapted to swing to said vertical position, means for separately lifting each of said containers from the others, and means on said containers for releasably supporting them together to form said cylindrical receptacle, said means comprising an extension on each of said segments adapted to overlap the adjacent marginal portion of the segment adjacent thereto that forms the third side wall of the adjacent container.

4. A steamer for asparagus comprising a cylindrical receptacle divided into separable individual wedge-shaped containers having their apices disposed adjacent and around the central vertical axis of said receptacle, and each having two adjacent perforated side walls extending divergently and radially from said axis to the cylindrical wall of the said receptacle, said cylindrical wall being divided into separate perforated segments respectively extending between each of said two adjacent side walls and forming the third side of each container, a perforated bottom wall at the lower end of each container swingably supported on one of the said two adjacent side walls of each container for swinging downwardly from a horizontal asparagus supporting position to a vertical position depending from said one of the two adjacent side walls, rotary means adjacent said axis and in each of said containers for releasably supporting the bottom wall of each container in said horizontal position and movable upon said means to a position in which each of said bottom walls is adapted to swing to said vertical position, means for separately lifting each of said containers from the others, and means on said containers for releasably supporting them together to form said cylindrical receptacle, said means for separately lifting each of said containers from the other including a handle connected with each container and extending from said axis centrally over each container.

5. In an asparagus steamer a wedge-shaped container having a pair of perforated vertical side walls extending divergently from joining relation of one of their vertical edges and having a third perforated vertical side wall extending between and connecting the opposite vertical edges of said pair of side walls, a perforated bottom wall closing the lower end of said container and pivotally supported along one of its edges to one of said pair of side walls for swinging from a horizontal asparagus supporting position to a vertical position depending from said one of said pair of side walls for freeing asparagus thereon for dropping from said container, a horizontal rod pivotally supported at a point adjacent the joined edges of said pair of side walls for swinging horizontally from a supporting position supporting the edge of said bottom wall that is along the side wall opposite the one to which said bottom is pivoted to a releasing position alongside the wall to which said bottom is pivoted for holding said bottom horizontal when said rod is in said supporting position and for releasing said bottom when said rod is in said releasing position, means accessible from above said container and connecting with said rod for manually swinging said rod between said holding and said releasing positions, said rod being adapted to raise said bottom from said vertical position to said horizontal positon upon being swung from said releasing position to said holding position.

6. An assembly for use in a steamer comprising a plurality of wedge-shaped containers each having a curved perforated vertically extending side wall in the form of a section of a vertical cylinder and a pair of flat side walls of similar shape extending convergently from the vertical edges of said curved side wall to a point substantially coincident with the vertical radius of the curve of the latter, the radii of the curved side walls of the said container being equal and the horizontal widths of said curved side walls being such that they are adapted to define a complete cylinder when the containers are in assembled relationship, an extension on each of said curved side walls adapted to extend over the marginal portion of the curved side wall of the adjacent container for nesting said container when in said assembled relationship, and a handle for manually lifting each container from said nested assembled relationship, said handles being grouped about the central vertical axis of said assembly and extending radially from said axis toward said curved side walls.

7. An assembly for use in a steamer comprising a plurality of wedge-shaped containers each having a curved perforated vertically extending side wall in the form of a section of a vertical cylinder and a pair of flat side walls of similar shape extending convergently from the vertical edges of said curved side wall to a point substantially coincident with the vertical radius of the curve of the latter, the radii of the curved side walls of the said container being equal and the horizontal widths of said curved side walls being such that they are adapted to define a complete cylinder when the containers are in assembled relationship, an extension on each of said curved side walls adapted to extend over the marginal portion of the curved side wall of the adjacent container for nesting said container when in said assembled relationship, the said containers each having a perforated bottom swingable on one of said flat side walls from a horizontal to a vertical position depending from said side wall, and movable means including a rod extending alongside the flat side walls of each container adjacent their juncture and below the bottom wall of each container manually actuatable for releasably supporting each bottom horizontal and for returning each bottom from depending position to horizontal position.

EMILIE MASON WILSON.

REFERENCES CITED

The following references are of record in the file of this patent:

UNITED STATES PATENTS

| Number | Name | Date |
|---|---|---|
| 751,433 | Kennedy | Feb. 2, 1904 |
| 780,204 | Lagerquist | Jan. 17, 1905 |
| 1,482,203 | Sakamoto | Jan. 29, 1924 |
| 1,760,761 | March | May 27, 1930 |
| 1,909,983 | Powell | May 23, 1933 |

FOREIGN PATENTS

| Number | Country | Date |
|---|---|---|
| 58,429 | Norway | Sept. 27, 1937 |